US005215368A

United States Patent [19]

Neumann

[11] Patent Number: 5,215,368

[45] Date of Patent: Jun. 1, 1993

[54] HEADLIGHT OF A MOTOR VEHICLE FOR BOTH HIGH-BEAM AND LOW-BEAM OPERATION

[75] Inventor: Rainer Neumann, Stuttgart, Fed. Rep. of Germany

[73] Assignee: Robert Bosch GmbH, Stuttgart, Fed. Rep. of Germany

[21] Appl. No.: 905,904

[22] Filed: Jun. 29, 1992

[30] Foreign Application Priority Data

Jul. 17, 1991 [DE] Fed. Rep. of Germany ....... 4123658

[51] Int. Cl.[5] ............................................ B60Q 1/04

[52] U.S. Cl. .................................... 362/61; 362/211; 362/297; 362/304; 362/346

[58] Field of Search ................ 362/61, 211, 296, 346, 362/347, 349, 350, 311, 304, 297

[56] References Cited

U.S. PATENT DOCUMENTS

| | | | |
|---|---|---|---|
| 2,253,615 | 8/1941 | Falge et al. | 362/211 |
| 4,755,919 | 7/1988 | Lindae et al. | 362/304 |
| 4,945,453 | 7/1990 | Serizawa et al. | 362/61 |
| 5,055,981 | 10/1991 | Nino | 362/297 |
| 5,060,120 | 10/1991 | Kobayashi et al. | 362/61 |

FOREIGN PATENT DOCUMENTS

| | | | |
|---|---|---|---|
| 0254622 | 1/1963 | Australia | 362/211 |
| 3628441 | 2/1988 | Fed. Rep. of Germany . | |
| 1242767 | 8/1960 | France | 362/211 |

*Primary Examiner*—Ira S. Lazarus
*Assistant Examiner*—Alan B. Cariaso
*Attorney, Agent, or Firm*—Michael J. Striker

[57] ABSTRACT

The headlight for a motor vehicle operable to produce a high-beam light distribution and a low-beam light distribution, has a reflector divided into an upper sector, a lower sector, a right sector and a left sector; an incandescent lamp with two axially-extending filaments mounted in the reflector, the filaments being spaced from each other and spaced approximately equally from the reflector peak; and a glass pane over a light aperture of the reflector. The upper sector and lower sector of the reflector are each shaped like a paraboloid-ellipsoid and the left sector and right sector are each parabolic. One filament is arranged along or close to and below the optic axis of the reflector to produce a high-beam light distribution when energized in operation and the other filament is arranged above the optic axis and to the right in relation to an issuing light beam to produce a low-beam light distribution in operation without additional optic devices in the glass pane covering the aperture.

8 Claims, 2 Drawing Sheets

HEADLIGHT OF A MOTOR VEHICLE FOR BOTH HIGH-BEAM AND LOW-BEAM OPERATION

BACKGROUND OF THE INVENTION

The present invention relates to headlights for motor vehicles.

A headlight for a motor vehicle is known having a reflector, in which an incandescent lamp with at least one axially-extending filament is mounted. The reflector is divided into an upper and a lower sector and a left and right sector. Each of the upper and lower sectors has a paraboloid-ellipsoid shape, i.e. the horizontal longitudinal cross-section is elliptical and the vertical longitudinal cross-section is parabolic. The left and right sector are each parabolic. A cover plate or glass pane is provided over a light aperture of the reflector.

This type of headlight is described in German patent application no. DE-AI 36 28 441. This headlight is a purely low-beam headlight and has a reflector in which an incandescent lamp with an axially-extending filament is mounted. The reflector has an upper and lower sector and a left and a right sector constructed as described in the above paragraph as well as the glass pane covering the light aperture. The filament extends approximately along the optical axis of the reflector. By these features the reflector already produces a low-beam light distribution, which satisfies the legal requirements without requiring additional optic means in the pane of glass in front of the reflector. This headlight is however only designed for low-beam light, so to produce a high beam an additional special headlight is also required, which adds to the expenses in buying and maintaining the automobile.

SUMMARY OF THE INVENTION

It is an object of the present invention to provide an improved headlight, which does not have the above-described disadvantage, but still satisfies the legal requirements for low-beam operation.

This object and others which will be made more apparent hereinafter are attained in a headlight for a motor vehicle comprising a reflector divided into an upper sector, a lower sector, a left sector and a right sector; an incandescent lamp with at least one axially-extending filament mounted in the reflector and a glass pane mounted over a light aperture of the reflector. The upper and lower sectors are paraboloid-ellipsoid and the left and right sector are parabolic.

According to the invention, the incandescent lamp has two filaments, instead of one, displaced from each other and parallel to each other, each of which are spaced approximately the same axial distance from the reflector peak. One filament produces high-beam light and the other, low-beam light. The filament producing the high-beam light is arranged extending along the optic axis of the reflector or close to and below it. The other filament producing the low-beam light is arranged above the optic axis and to the right in relation to the direction of issuing light rays from the reflector.

The headlight of the invention has the advantage that it can produce both low-beam light and high-beam light without additional optic means in the glass pane over the light aperture, although such optic means can be provided to further improve the light distribution. Because the high-beam light filament is arranged approximately on the optic axis, a good high-beam light distribution is produced with a maximum light intensity in the center of the distributed light. Because the other filament producing the low-beam light is arranged above the optic axis and to the right in relation to the direction of the issuing light rays (i.e. to the right of an individual facing in that direction) the center of the light intensity distribution of the anti-dazzle or low-beam light is shifted to the right as is required for the low-beam light distribution.

Several other advantageous embodiments of the above-described invention are possible. In one embodiment the parabolic axes of the parabolic lateral (i.e. right and left) sectors are inclined downwardly relative to the optic axis of the reflector so all the low-beam light from the low-beam filament reflected from the lateral sectors falls under a predetermined light-dark boundary. It is also advantageous, if the focal points of the parabolic lateral sectors are approximately on the optic axis and spaced from the reflector peak approximately the same distance as a central portion of the low-beam filament.

In a preferred embodiment the lines of intersection produced by intersection of a horizontal longitudinal plane through the paraboloid-ellipsoid upper and lower sectors are elliptical in the vicinity of the reflector peak and vary from an elliptical path at the outer edges of the sectors, advantageously having a reduced curvature from that of the ellipse in the outer edge regions of these sectors. In this preferred embodiment then the light distribution can be optimized and a sharp light-dark boundary can be maintained.

In another advantageous embodiment of the invention a first focal point of the paraboloid-ellipsoid upper sector is located approximately on the optic axis and is spaced axially from the reflector peak approximately the same distance as an end portion of the low-beam filament closest to the reflector peak and a first focal point of the paraboloid-ellipsoid lower sector is located approximately on the optic axis and is spaced axially from the reflector peak approximately the same distance as another end portion of the low-beam filament furthest from the reflector peak. With this embodiment all reflected light by the upper and lower sector falls under the light-dark boundary.

Advantageously the glass pane covering the light aperture can have cylindrical lenses in the vicinity of its lower edge to improve the light distribution.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
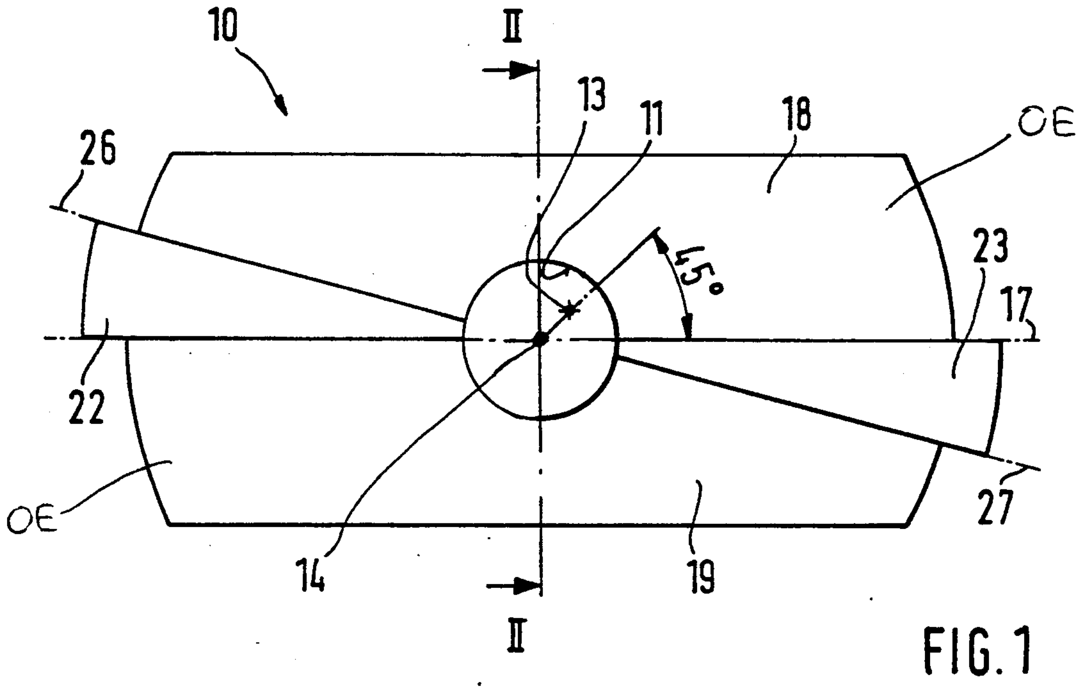
FIG. 1 is a rear view of a reflector of the headlight according to the invention.

A headlight for a motor vehicle has a reflector 10, which is divided into four sectors and an opening 11 for insertion of an incandescent lamp 12. The incandescent lamp 12 has an axial filament 13 for producing an low-beam light beam and an axial filament 14 for producing a high beam. Both filaments 13, 14 are arranged approximately parallel to each other spaced approximately the same distance d from the reflector peak P. The incandescent lamp 12 is arranged in its mounted position in reflector 10 so that its filament 14 producing the high-beam light is arranged approximately along the optic axis 16 of the reflector 10 or close to and below it. The other filament 13 producing the low-beam light is arranged above the optic axis 16 and to the right in relation to the direction of the issuing light rays as seen in FIG. 1. The low-beam filament 13 is advantageously in a plane containing the optic axis 16 and inclined upwardly at about a 45° angle to a horizontal central plane 17 containing the optic axis 16. A glass pane 15, which can be pivotable both relative to a vertical axis and also to a transverse axis, is arranged in front of the reflector 10.

The reflector 10 has an upper sector 18 and a lower sector 19, which are each shaped like paraboloid-ellipsoids. A paraboloid-ellipsoid has a parabolic vertical longitudinal cross-section (parabola 21 in the Drawing) and an elliptical horizontal longitudinal cross-section. The intersection lines between a horizontally-intersecting plane and the paraboloid-ellipsoid gradually make a transition from elliptical curves to parabolic curves as the plane is rotated until it reaches a vertical orientation from a horizontal orientation. The paraboloid-ellipsoids of the upper sector 18 and the lower sector 19 can be equal, but in the preferred embodiment shown here are different. In the upper sector 18 the first focal point F18 of the ellipse of the horizontal longitudinal cross-section plane coincides approximately with the focal point of the parabola 21 in the vertical longitudinal cross-section plane and is approximately on the optic axis 16 and spaced from the reflector peak P approximately the same distance as an end portion of the low-beam filament 13 closest to the reflector peak P. In the lower sector 18 the first focal point F19 of the ellipse of the horizontal longitudinal cross-section plane coincides approximately with the focal point of the parabola 21 in the vertical longitudinal cross-section plane and is approximately on the optic axis 16 and spaced from the reflector peak P approximately the same axial distance as another end portion of the low-beam filament 13, the other end portion being furthest of the end portions from the reflector peak.

The reflector 10 has a left sector 22 as seen in the direction light issues from the reflector and a right sector 23. Both sectors 22,23 are parabolic. The left sector 22 bounds approximately the lower sector 19 at the horizontal plane 17 and bounds approximately the upper sector 18 at a plane 26 inclined upwardly relative to the horizontal central plane 17. The right sector 23 adjoins approximately the upper sector 18 at the horizontal plane 17 and bounds approximately the lower sector 19 at a plane 27 inclined downwardly relative to the horizontal central plane 17. The lateral sectors 22,23 can project at their outer edge regions beyond the edge of the upper and lower sectors 18,19. The paraboloids of the lateral sectors 22,23 have relatively large focal length, e.g. 27 mm. The focal point F22 and/or F23 of the paraboloids of the lateral sectors 22,23 are approximately on the optic axis 16 and are spaced from the reflector peak approximately the same distance as a central portion of the low-beam filament 13. The axis 28 of the parabolas are inclined downwardly relative to the optic axis 16 of the reflector 10.

Figure 3:
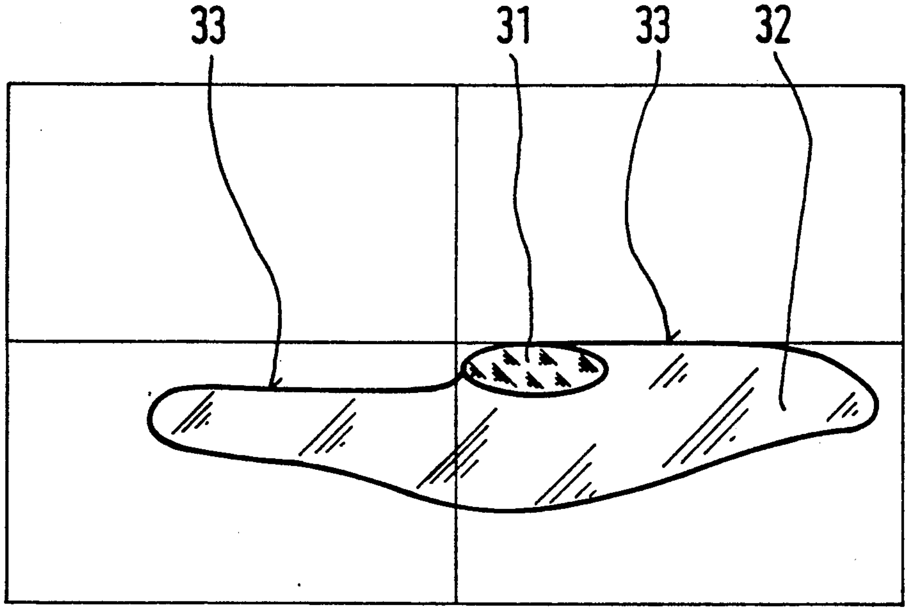
FIG. 3 is an illustration of the light distribution produced on a measuring screen when the headlight is operated to produce low-beam light.

In operation anti-dazzle or low-beam light is produced by reflector 10 in a light distribution shown in FIG. 3. This corresponds already to the light distribution as required in the USA. Light is reflected by the lateral sectors 22,23 above all into the center 31, the so-called hot spot of the light distribution. The upper and lower sectors 18,19 reflect light horizontally dispersed in a wide light beam 32 of the light distribution. Because the axes 28 of the lateral sectors 22,23 are downwardly inclined, the light reflected from them is directed below a predetermined approximately horizontal light-dark boundary 33. The light reflected from the upper and lower sectors 18,19 is similarly located under the light-dark boundary, because of the previously described positions of the focal points.

The intersection lines resulting from intersection of a horizontal longitudinal section plane with the upper and lower sectors 18,19 are advantageously exactly elliptical only in the region of the reflector peak P. In the vicinity of the outer edges OE the path of the intersection lines deviates from an elliptical path. The mathematical equation of the intersection line there differs from that of an ellipse by a higher order correction factor. The curvature of the intersection line is reduced at the outer edges OE of the ellipse and is selected so that the images of the filament 13 reflected from the sectors 18,19 are located under and along the light-dark boundary 33 and overlap each other. The overlap of the images of the filament 13 from the upper and lower sectors 18,19 and the lateral sectors 22,23 produce a continuous light distribution. The deviation of the curvature of the intersection lines of a plane through the upper and lower sectors from the curvature of an ellipse decreases when proceeding from horizontally intersecting plane to vertically intersecting plane so that a pure parabolic intersection line 21 results from a vertically intersecting plane.

Figure 4:
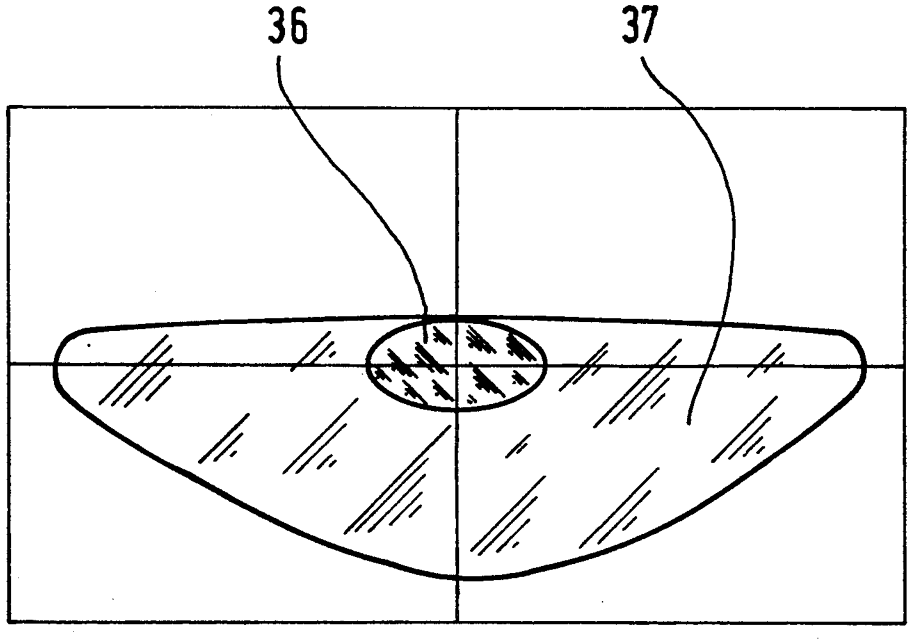
FIG. 4 is an illustration of the light distribution produced on a measuring screen when the headlight is operated to produce high beam light.

In FIG. 4 the light distribution produced by reflector 10 in high beam operation with the high beam filament 14 switched on is sufficient to satisfy the legal regulations in the USA. Light is reflected by the lateral sectors 22,23 into the center 36 of the light distribution. The upper and lower sectors 18,19 reflect light dispersed horizontally in low-beam or anti-dazzle operation into the region 37 of the light distribution and provide the required width of the light distribution.

Figure 2:
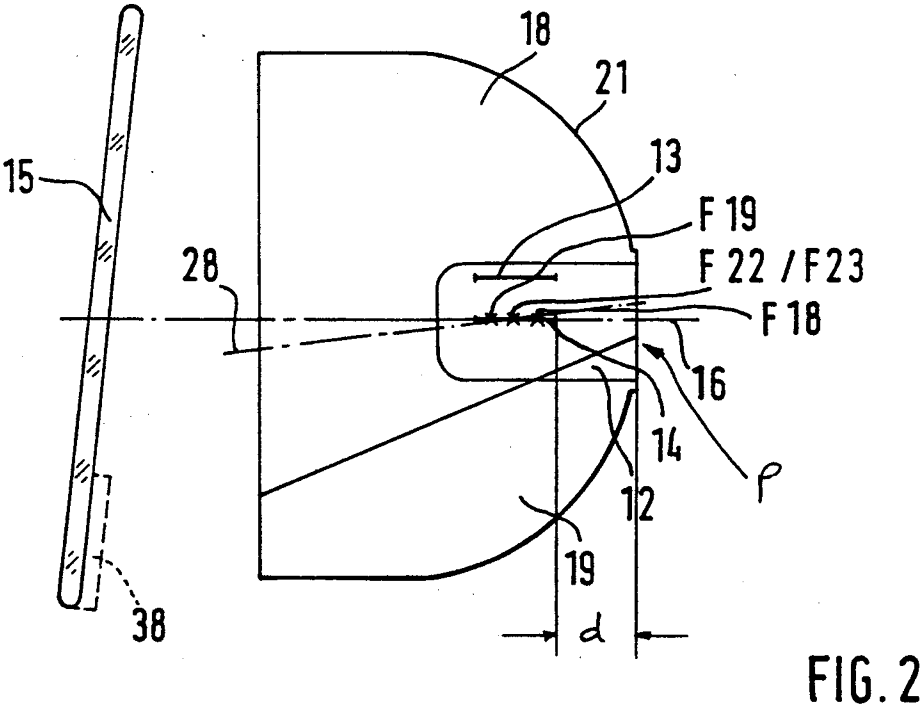
FIG. 2 is a cross-sectional view through the headlight of FIG. 1 taken along section line II—II of the FIG. 1.

The light distribution in low beam and high beam operation can be made more uniform, which means that local light intensity variations are eliminated, by providing vertically extending cylindrical lenses 38 in the pane of glass 15 in the vicinity of its lower edge, as indicated in FIG. 2. Light reflected from the reflector 10 is horizontally dispersed by the cylindrical lenses. The cylindrical lenses 28 can for example have a height of about 1 cm and be arranged over a width of about 10 cm.

While the invention has been illustrated and described as embodied in a headlight for a motor vehicle for high-beam and low-beam operation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. A headlight for a motor vehicle operable to produce a high-beam light distribution and a low-beam light distribution, said headlight comprising a reflector having a light aperture, an optic axis and a reflector peak and being divided into an upper sector, a lower sector, a right sector and a left sector; an incandescent lamp with two axially-extending filaments mounted in the reflector, said filaments being spaced from each other and spaced approximately equally from the reflector peak; and a pane of glass over the light aperture of the reflector, wherein the upper sector and lower sector of the reflector are each shaped like a paraboloid-ellipsoid, and the left sector and right sector are each parabolic, one of the filaments being arranged on or just below the optic axis of the reflector to produce said high-beam light distribution in operation and the other of the filaments being arranged above the optic axis and to the right in relation to a direction of light issuing from the reflector to produce said low-beam light distribution in operation.

2. A headlight according to claim 1, wherein the filament producing the low-beam light distribution is arranged in a plane inclined upwardly at about a 45° angle to a horizontal central plane containing the optic axis.

3. A headlight according to claim 1, wherein the right and left sectors each have a parabolic axis inclined downwardly relative to the optic axis.

4. A headlight according to claim 1, wherein the right sector and the left sector each have a focal point and the focal points are approximately on the optic axis of the reflector and spaced an axial distance from the reflector peak approximately the same as that of a central portion of the filament producing the low-beam light distribution.

5. A headlight according to claim 1, wherein the upper and lower sectors are shaped so that a horizontal plane intersecting the upper and lower sectors generates intersection lines following an elliptical path in the vicinity of the reflector peak and deviating from the elliptical path in an outer edge region of the reflector.

6. A headlight according to claim 5, in which the intersection lines in the outer edge region of the reflector have a curvature less than a curvature of the elliptical path in the outer edge region.

7. A headlight according to claim 1, wherein a first focal point of the upper sector is located approximately on the optic axis and is spaced an axial distance from the reflector peak approximately the same as that of an end portion of the filament producing the low-beam light distribution closest to the reflector peak and a first focal point of the paraboloid-ellipsoid lower sector is located approximately on the optic axis and is spaced another axial distance from the reflector peak approximately the same as that of another end portion of the filament producing the low-beam light distribution furthest from the reflector peak.

8. A headlight according to claim 1, wherein the glass pane is provided with a plurality of cylindrical lenses in the vicinity of a lower edge thereof.

* * * * *